United States Patent
Gao et al.

(10) Patent No.: US 8,255,412 B2
(45) Date of Patent: Aug. 28, 2012

(54) BOOSTING ALGORITHM FOR RANKING MODEL ADAPTATION

(75) Inventors: Jianfeng Gao, Kirkland, WA (US); Yi Su, Baltimore, MD (US); Qiang Wu, Sammamish, WA (US); Chris J. C. Burges, Bellevue, WA (US); Krysta Svore, Seattle, WA (US); Elbio Renato Torres Abib, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 12/337,623

(22) Filed: Dec. 17, 2008

(65) Prior Publication Data

US 2010/0153315 A1   Jun. 17, 2010

(51) Int. Cl.
   *G06F 7/00* (2006.01)
   *G06F 17/30* (2006.01)
(52) U.S. Cl. .......... 707/765; 707/713; 707/723; 706/12; 706/45
(58) Field of Classification Search .................. 707/713, 707/723, 765; 706/12, 45
   See application file for complete search history.

(56) References Cited

U.S. PATENT DOCUMENTS

| | | | |
|---|---|---|---|
| 6,418,431 B1 * | 7/2002 | Mahajan et al. | 1/1 |
| 7,016,881 B2 | 3/2006 | Li | |
| 7,283,982 B2 | 10/2007 | Pednault | |
| 7,716,225 B1 * | 5/2010 | Dean et al. | 707/748 |
| 7,769,763 B1 * | 8/2010 | Bem et al. | 707/749 |
| 2003/0225750 A1 * | 12/2003 | Farahat et al. | 707/3 |
| 2003/0226100 A1 * | 12/2003 | Farahat et al. | 715/500 |
| 2004/0215430 A1 * | 10/2004 | Huddleston et al. | 703/2 |
| 2005/0060290 A1 | 3/2005 | Herscovici | |
| 2006/0062451 A1 * | 3/2006 | Li et al. | 382/159 |
| 2007/0203908 A1 | 8/2007 | Wang | |
| 2008/0059508 A1 | 3/2008 | Lu | |
| 2009/0150126 A1 * | 6/2009 | Sellamanickam et al. | 703/2 |
| 2009/0210407 A1 * | 8/2009 | Freire et al. | 707/5 |
| 2010/0082421 A1 * | 4/2010 | Tuladhar et al. | 705/14.41 |

OTHER PUBLICATIONS

Chen et al.; Trada: Tree Based Ranking Function Adaptation; Date Published: Oct. 2008; CIKM '08 Proceeding of the 17th ACM conference on Information and knowledge management.

Buja et al.; Comment: Boosting Algorithms: Regularization, Prediction and Model Fitting; Date Published: 2007; Statistical Science 2007, vol. 22, No. 4, 477-505.

Lu et al.; Coupling Feature Selection and Machine Learning Methods for Navigational Query Identification; Date Published: Nov. 2006; In Proceedings of the Fifteenth ACM Conference on Information and Knowledge Management (CIKM 2006).

Boosting Trees for Regression and Classification; Date Published: Oct. 14, 2008; http://www.statsoft.com/textbook/stbootres.html#The%20Problem%20of%20Overfitting;%20Stochastic%20Gradient%20Boosting.

(Continued)

*Primary Examiner* — John E Breene
*Assistant Examiner* — Joshua Bullock (57) ABSTRACT

Model adaptation may be performed to take a general model trained with a set of training data (possibly large), and adapt the model using a set of domain-specific training data (possibly small). The parameters, structure, or configuration of a model trained in one domain (called the background domain) may be adapted to a different domain (called the adaptation domain), for which there may be a limited amount of training data. The adaption may be performed using the Boosting Algorithm to select an optimal basis function that optimizes a measure of error of the model as it is being iteratively refined, i.e., adapted.

5 Claims, 5 Drawing Sheets

OTHER PUBLICATIONS

Sebastiani et al.; An Improved Boosting Algorithm and its Application to Text Categorization; Date Published: 2000; CIKM '00 Proceedings of the ninth international conference on Information and knowledge management.

Li et al.; Learning to Rank Using Classification and Gradient Boosting; Date Published: Jan. 2008.

Burges et al.; Learning to Rank with Nonsmooth Cost Functions; ICML 2006.

Burges et al.; Learning to Rank using Gradient Descent; ICML 2005.

Friedman; Stochastic gradient boosting; Technical report, Standford University; 1999.

Friedman; Greedy function approximation: a gradient boosting machine; Annals of Statistics 29(5) 2001.

Wu et al.; Ranking, Boosting, and Model Adaptation; Date Published: Apr. 2009.

* cited by examiner

| 1 | Let $F_0(\mathbf{x})$ be the background ranking model |
|---|---|
| 2 | For $m = 1$ to $M$ do: |
| 3 | $y'_i = y_i - F_{m-1}(\mathbf{x}_i)$, for $i = 1 \ldots N$ ←------- (compute the residual of the current base model) |
| 4 | $(h_m, \beta_m) = \underset{h,\beta}{\operatorname{argmin}} \sum_{i=1}^{N} [y'_i - \beta h(\mathbf{x}_i)]^2$ ←------ (select the optimal basis function) |
| 5 | $F_m(\mathbf{x}) = F_{m-1}(\mathbf{x}) + \beta_m h(\mathbf{x})$ ←------- (update the base model by adding the optimal basis function) |

The Boosting algorithm for ranking model adaptation

| | |
|---|---|
| 1 | Let $F_0(\mathbf{x})$ be the background ranking model |
| 2 | For $m = 1$ to $M$ do: |
| 3 | Draw at random the subsample of features and the subsample of training data |
| 4 | Compute residuals according to Equation (5) on the subsamples |
| 5 | Select best $h_m$ (with its best coefficient $\beta$), according to Equations (6) and (7), on the subsamples |
| 6 | Base model update $F_m(\mathbf{x}) = F_{m-1}(\mathbf{x}) + \upsilon \beta_m h(\mathbf{x})$ |

The stochastic Boosting algorithm for ranking model adaptation

| | |
|---|---|
| 1 | Let $F_0(\mathbf{x})$ be the background ranking model |
| 2 | For $m = 1$ to $M$ do: |
| 3 | Draw at random the subsample of features and the subsample of training data |
| 4 | Compute residuals according to Equation (5) on the subsamples |
| 5 | Select top $J$ features according to Equations (6) and (7), on the subsamples, and form $h_m = \sum_{j=1}^{J} w_j f_j = \mathbf{w} \cdot \mathbf{f}$, where $\mathbf{w}$ is a least squares solution of $\mathbf{Aw} = \mathbf{b}$, as in Equations (11) to (15) |
| 6 | Base model update $F_m(\mathbf{x}) = F_{m-1}(\mathbf{x}) + vh(\mathbf{x})$ |

The stochastic Boosting algorithm for ranking model adaptation with local linear model fitting

FIG. 5

BOOSTING ALGORITHM FOR RANKING MODEL ADAPTATION

BACKGROUND

In the field of document or web search, a basic goal is to rank documents matching a query according their computed relevancy to the query. A common technique for ranking documents is to use large sets of training data to train a statistical model offline, and then use the statistical model online to the help determine the relevancy of documents to queries submitted to a search engine.

Figure 1:
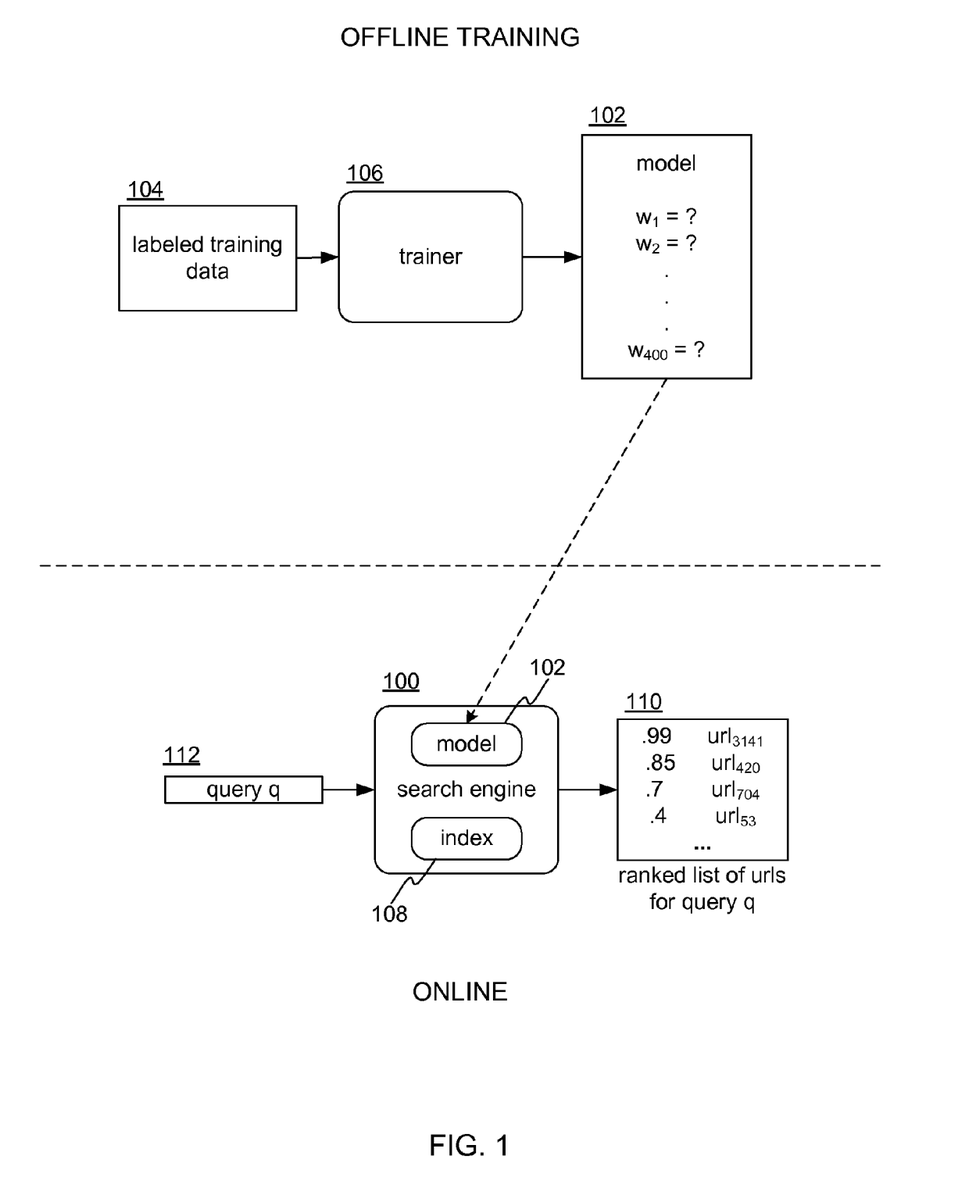
FIG. 1 shows an example of a search engine using a trained model.

FIG. 1 shows an example of a search engine 100 using a trained model 102. The model 102 is trained offline by passing labeled training data 104 to a trainer 106. The labeled training data is typically a set of documents with respective labels entered to represent human analysis of the documents. For example, labels may range in value from 0 to 4 (or 0 to 1, or −1 to 1, etc.), to indicate a level of relevance that a human perceived a given document had for a given query. Often the training will involve computing a vector of features for each document-query pair, and passing the vectors and their respective document relevance labels of the given query to the trainer 106 (each vector representing a same set of feature types, but with values varying from vector to vector according to the content of the respective document-query pairs).

Figure 2:
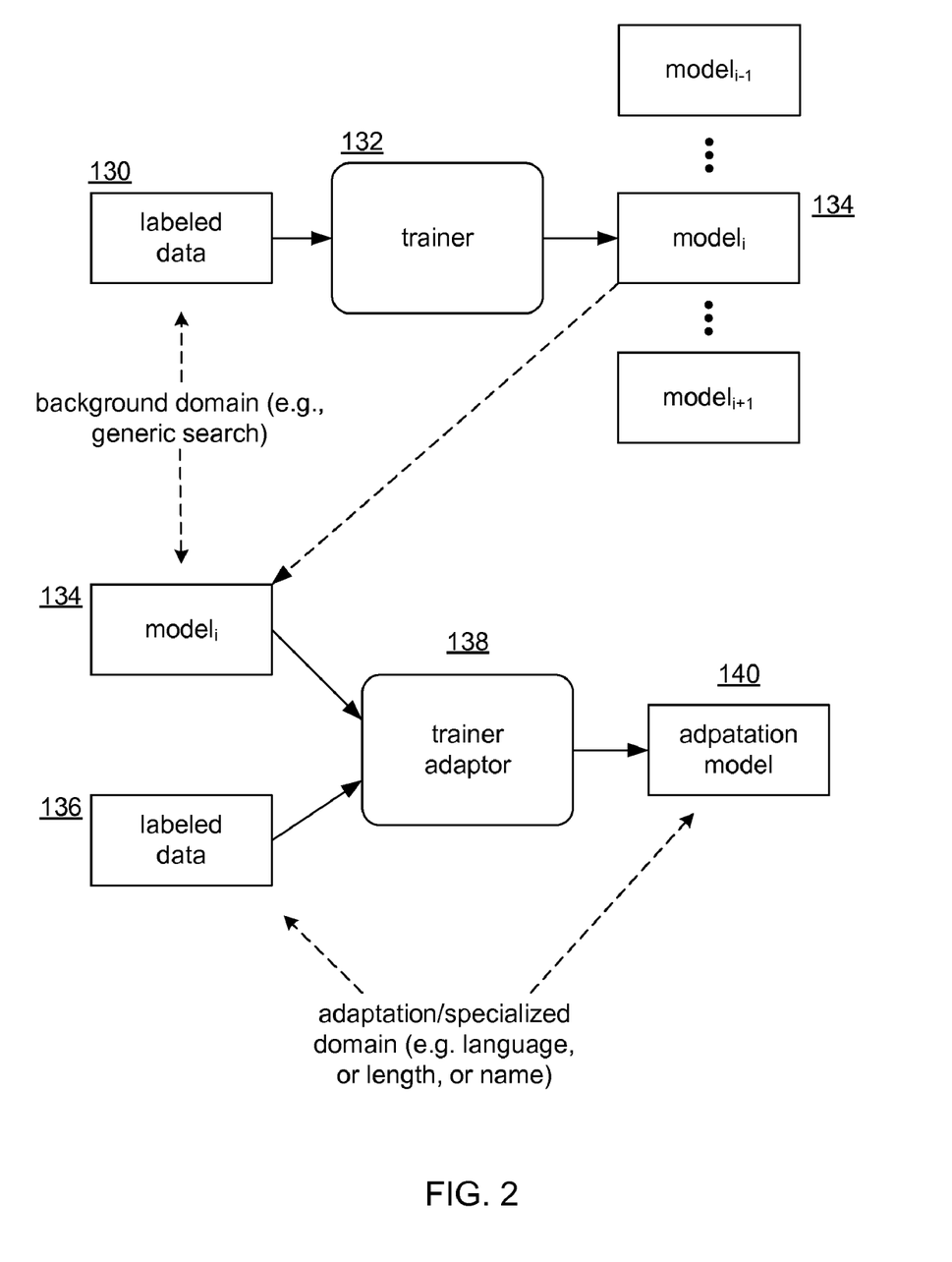
FIG. 2 shows a general framework for model adaptation.

The trainer 106 analyzes the labeled training data 104, perhaps in the form of many vector-label pairings, and builds a statistical model 102 that puts the collective knowledge of the training data 104 into a form—the model 102—that can be used to rank documents. There are many types of models that may be used, for example learning machines such as support vector machines and neural networks. In the example of FIG. 2, the model 102 is simply a linear model that computes weights $w_i$ of the respective features. The model 102 is then used by the search engine 100, along with a document index 108, to find and rank documents 110 that match queries 112. The scores of the documents 110 are wholly or partly derived from the model 102. In some cases, multiple models may be combined. However, there are several problems created by this general offline training approach.

Often, a model must be completely retrained when the training data is augmented or altered, even if most of the original training data is unchanged. Also, it may be difficult to derive a model that is tailored for special search domains, such as language-specific searches, searches for particular types of information (e.g., proper names), to name a few examples.

Techniques to improve model training are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Model adaptation may be performed to take a general model trained with a set of training data (possibly large), and adapt the general model using a set of domain-specific training data (possibly small). The parameters, structure, or configuration of a model trained in one domain (called the background domain) may be adapted to a different domain (called the adaptation domain), for which there may be a limited amount of training data. The adaption may be performed using the Boosting Algorithm to select an optimal basis function that optimizes a measure of error of the model as it is being iteratively refined, i.e., adapted.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments discussed below relate to model adaptation. For many trained ranking models, the quality of ranking depends largely upon the amount of labeled training data (i.e., human-judged query-url pairs). For some query domains, e.g. non-English queries or name queries, the amount of trained data may be small, and a model trained with such data may produce low quality (inaccurate) rankings.

Model adaptation may be performed to take a general model trained with a large set of training data, and adapt the model using a small set of domain-specific training data. In other words, the parameters, structure, or configuration of a model trained in one domain (called the background domain) may be adapted to a different domain (called the adaptation domain), for which there may be a limited amount of training data. In the field of web search, domains can be arbitrarily defined by factors such as language, dates, query segments/size, and so on. That is, documents/queries/labels in a domain may share a common trait such as being in a same language, or having a same feature (e.g., minimum length of query), or relating to a common topic (e.g., instruction manuals, restaurant reviews, etc.), and so on.

FIG. 2 shows a general framework for model adaptation. Labeled training data 130 is received by a trainer 132 to generate background ranking model 134. The models and trainers may reside on one or more servers hosting or communicating with one or more search engine servers. The labeled training data 130, also called background training data, has pairings of background documents and background queries, and respective human-generated labels indicating human-perceived relevance of the background documents to the background queries. The background labeled training data 130 is not specific to any particular search domain, but rather may include documents and queries from arbitrary search domains (e.g., a random sampling of a general-purpose search engine's queries and matched documents). Different trainings per different training data may result in different background models. In one embodiment, adaptation may be performed to adapt a domain-specific base model to a sub-domain of the domain. Furthermore, there is no requirement that a background model be adapted with domain-specific training data; the methods of adaption used herein may also be useful for other purposes and will be able to adapt a model regardless of any domain (or lack thereof) of the adaption training data.

Model$_i$ 134 and domain-specific labeled training data 136 are passed to an adaptive trainer, or trainer adaptor 138, which adapts the model$_i$ 134 to form an adaptation model 140 (also called an adaptation ranking model) specific to some adaptation domain. The trainer adaptor 138 may perform model adaptation using any of the techniques described below. The domain-specific labeled training data 136 includes pairings of domain-specific documents and domain-specific queries, and human-generated labels indicating human-perceived relevance of the domain-specific documents to the domain-specific queries. The adaptation model 140 may then be used in a retrieval system (e.g., search engine) to help rank documents in its specific search/adaptation domain.

Not shown in FIG. 2 are feature extraction modules that analyze document-query pairs and extract respective sets of features (feature vectors). Feature extraction and feature vectors are described in other available sources and are not described in detail herein. Nonetheless, it should be noted that features may include query-dependent features and query-independent features; in general the features may be extracted from a doc-query pair. The training of a model usually will involve passing a document-query pair's feature vector and the document's label (as well as a paired query) to a model trainer. Feature extraction be performed in a pre-processing stage of a model trainer or it may be performed before the model trainer receives the training data. In any case, it should be understood that in some embodiments, the models are trained using feature extraction and feature vectors. Furthermore, mention of passing document-query pairs to a model trainer is considered to include cases where document-query pairs are passed to a model trainer, and also cases where feature vectors are passed to a model trainer; "document-query pair" and "feature vector" are used synonymously with respect to model training. Additionally, consider that the embodiments described herein are generally compatible with the variety of known training data pre-processing techniques, such as document cleaning, phrase substitution, and so on.

Described below are techniques for model adaptation using the Boosting Algorithm. A background model may be adapted to a domain-specific adaptation model by using an iterative learning algorithm that applies the Boosting Algorithm. The Boosting Algorithm itself is described in full detail elsewhere, but will be explained herein as necessary.

Generally, the learning algorithm may involve starting with the background model, which, in terms of the algorithm, is referred to as the base model (initially the background model). With each iteration of the learning algorithm, a new function is constructed to provide correction of estimate ranking errors made by the base model. Error estimation will be described further below. A new base model is then formed by combining the base model and the new function, for example, by linear interpolation. The learning algorithm continues until new functions are deemed to no longer sufficiently reduce the ranking errors. The final model may be called an additive model because it is a linear combination of a sequence of elementary functions.

The function mentioned above may be thought of as a new type of feature, where a ranking model is viewed as a set of weighted features. Then, with each iteration of the learning algorithm, a new/refined ranking model (which consists of only one feature—called the basis function) is constructed to correct errors of the current version of the base model (the model being refined/adapted). The base model is then updated by linearly interpolating the previous base model with the newly constructed single-feature ranking model.

The description of the model adaptation learning algorithm will be described first by reviewing ways of measuring web search quality and also a ranking model that may be used in the learning algorithm. The Boosting Algorithm will then be described in general and modifications will be described in detail. Variations and enhancements of the learning algorithm will then be discussed.

Ranking Model and Quality Measure in Web Search

As mentioned above, there are a variety of types of ranking models available for use. This section reviews explains some aspects of the LambdaRank model. Detailed description of the model can be found elsewhere. LambdaRank shares common elements with other ranking models and is a suitable example, although model adaption techniques described herein may be used with other types of ranking models.

LambdaRank is a neural-net ranker that maps a feature vector x (extracted from a document corresponding to a query-url pair) to a real y that indicates a relevance of the URL of the query according to the model as trained. This value y may also be called a relevance score (in practice, y may be a label). To explain further, a linear LambdaRank simply maps x to y with a learned weight vector w such that y=w·x.

Of interest is the way w is learned with LambdaRank. Typically, w is optimized with respect to a cost function using gradient-based numerical methods, provided that the cost function is smooth and its gradient with respect to w can be readily computed. For the ranker to perform well for a document retrieval system, it may help if the cost function used during training is the same or similar (as may be possible) to the measure used to assess the final quality of the retrieval system. In the field of web search, the retrieval system's final quality may be assessed via the Normalized Discounted Cumulative Gain (NDCG). The NDCG is a cumulative measure of ranking quality. For a query q, NDCG is computed as $$N_i = N_i \sum_{j=1}^{L} (2^{r(j)} - 1)/\log(1 + j) \qquad (1)$$

where r(j) is the relevance level of the j'th document (i.e., URL), and where the normalization constant $N_i$ is chosen so that a perfect ordering would result in $N_i=1$. Here, L is the ranking truncation level at which NDCG is computed. The $N_i$ are then averaged over a query set. The NDCG is particularly well suited to Web search applications because it is multilevel and because the truncation level can be chosen to reflect how many documents are shown to the user. However, in some cases NDCG may not serve well as a cost function because it is not smooth and it is not differentiable, thus presenting an obstacle to some optimization approaches that may use the gradient of the cost function (a gradient-using embodiment is described further below).

This obstacle may be avoided, particularly when using LambdaRank, by using an implicit cost function whose gradients are specified by rules. Formally, the gradient of the cost function C with respect to the score s of the document at rank position j, $s_j$, for a query, may be written as $$\frac{\partial C}{\partial s_j} = -\lambda_j(s_1, l_1, \ldots, s_n, l_n)$$

The sign is chosen so that positive $\lambda_j$ means that the document must move up the ranked list to reduce the cost. If two relevant documents of a query are ranked at positions $j_1$ and $j_2$, and if $j_2 \gg j_1$, then a preferred implicit cost will have the property that $$\left|\frac{\partial C}{\partial s_{j1}}\right| \gg \left|\frac{\partial C}{\partial s_{j2}}\right| \quad (2)$$

As shown to Equation (2), choosing such an implicit cost function is equivalent to choosing suitable $\lambda_j$, which themselves are specified by rules that depend on the ranked order (and scores) of all of the relevant documents. These choices are called $\lambda$-functions. In view of proven acceptable performance of LambdaRank with certain $\lambda$-functions intended for use as NDCG cost functions, it may be helpful to adapt ranking models in a way that directly optimizes their NDCG performance.

A Gradient Boosting Algorithm for Ranking Model Adaptation

The model adaptation method described next is based on variants of the Stochastic Gradient Boosting algorithm (or the Boosting algorithm for short), which was described by Freidman ("Stochastic gradient boosting", Technical report, Stanford University, 1999; and "Greedy function approximation: a gradient boosting machine", Annals of Statistics 29(5), 2001). Friedman's notations will be used hereafter. The method can also be viewed a special case of LambdaSMART, described by Wu, Burges, Svore and Gao ("Ranking, boosting, and model adaptation", MSR Tech-Report, 2008)

With the goal of adapting a background model (perhaps trained on large amounts of background domain data) to a new domain where only a small amount of adaptation data is available, the following may be assumed. Adaptation data (also called "training data") consists of a set of input/output pairs $\{x_i, y_i\}$, for $i=1 \ldots N$, where y is a human-assigned label or relevance score. For a Web search application, x may be a feature vector extracted from a query-url search pair. Assume approximately 2000 such features (the exact number may vary), including dynamic ranking features such as term frequency and BM25, and static features such as page rank.

To adjust the background model to a domain-specific model (F(x), mapping x to y) that minimizes a loss function L(y, F(x)) over the training data $$F^* = \operatorname{argmax}_F \sum_{i=1}^{N} L(y_i, F(x_i)). \quad (3)$$

Further assume that F(x) takes the form of additive expansion as $$F(x) = \sum_{m=0}^{M} \beta_m h(x; a_m), \quad (4)$$

where h(x; a) is called basis function, and is usually a simple parameterized function of the input x, characterized by parameters a (for discussion, h(x) will be used in place of a). In practice, the form of h is restricted to a specific function family to allow a practically efficient method of model adaptation. Note that $\beta$ is a real value coefficient of the basis function, and F(x) has a form of model interpolation, with h functioning as a component model and $\beta$ functioning as an interpolation weight.

Figure 3:
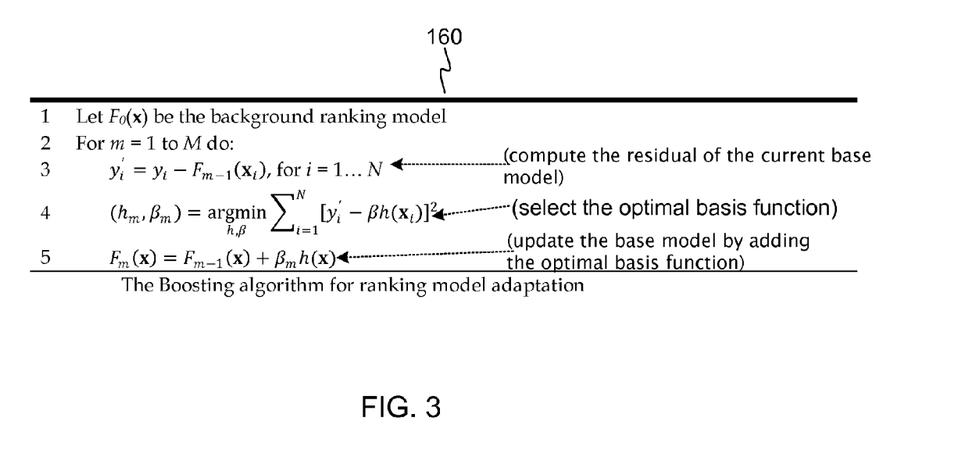
FIG. 3 shows an algorithm for using the Boosting Algorithm for model adaptation.

FIG. 3 shows an algorithm 160 for using the Boosting Algorithm for model adaptation. The Boosting Algorithm adapts a background model to a new domain-specific model F(x) based on training data in a forward stage-wise manner; the algorithm tries to add a new function (forward), and tries to not remove an existing function (backward), and at each step, the algorithm may add only one new function (stage-wise).

Starting at step 1 of algorithm 160 with an initial base model $F_0(x)$, which is the background model, then for m=1, 2, . . . , M (step 2 of algorithm 160) the algorithm 160 takes the following three steps to adapt the base model to better fit the adaptation data: (1) compute the residual of the current base model (step 3 of algorithm 160), (2) select the optimal basis function (step 4 of algorithm 160) that best fits the residual, and (3) update the base model by adding the optimal basis function (step 5 of algorithm 160).

Implementation of these three steps will now be described, including modifications that may be made for the Web search ranking task.

Compute the Residual

Step 3 of algorithm 160 computes the residual of the current base model for each training sample $y_i'=y_i-F_{m-1}(x_i)$, for $i=1 \ldots N$ ($y_i'$, also referred to as a ranking error, may indicate a degree to which the labeled relevance of $x_i$ varies from relevance of $x_i$ as computed by the current base model $F_{m-1}$). This estimates how many errors (measured in terms of the residual) the base model made on each training sample (note that the error is "counted" as an NDCG loss if the order of a pair of documents given a query is mistakenly swapped, as defined in Equation (2)). If the loss function in Equation (3) is differentiable, the residual can be computed quickly as the negative gradient of the loss function with respect to the current base model. As discussed above, in one embodiment a goal is to directly optimize the model for NDCG, whose gradient is approximated via the $\lambda$-function. Thus, the gradient of each training sample with respect to the current base model is computed by marginalizing the $\lambda$-functions of all pairs of URLs of a query that contains it, computed as $$y_i' = \sum_{j \neq i} \Delta NDCG \cdot \frac{\partial C_{ij}}{\partial s_{ij}} \quad (5)$$

where $s_{ij}$ is the difference in ranking scores of a pair URLs i and j of a query; $C_{ij}=C(s_{ij})$ is the cross entropy cost as defined in Equations (1) to (3) by Burges et al. (Burges, Shaked, Renshaw, Lazier, Deeds, Hamilton, Hullender, "Learning to Rank using Gradient Descent", ICML, 2005); and $\Delta NDCG$ is the NDCG gain from swapping the two URLs. This $\lambda$-function essentially uses the cross entropy cost to smooth the change in NDCG obtained by swapping the two URLs.

Select the Optimal Basis Function h

Step 4 of algorithm 160 finds both the optimal basis function h, and its optimal coefficient $\beta$, that best fits the residual. It was found that Least Squares (LS) may lead to an efficient algorithm for model adaptation. Letting h and $\beta$ denote the optimal basis function and its optimal coefficient, the squared-error loss on training data is computed as $$\sum_{i=0}^{N} (y_i' - \beta h)^2.$$

For each candidate h, its optimal coefficient can be estimated by solving the equation $$\frac{\partial \sum_{i=1}^{N} (y_i' - \beta h)^2}{\partial \beta} = 0$$

where $y_i'$ computed as Equation (5). Thus, $\beta$ can be computed as $$\beta = \frac{\sum_{i=1}^{N} y_i' h(x_i)}{\sum_{i=1}^{N} h(x_i)} \quad (6)$$

Then, given its optimal coefficient $\beta$, the optimal squared-error loss of h is $$LS(h; \beta) = \sum_{i=1}^{N} y_i' \times y_i' - \frac{\left(\sum_{i=1}^{N} y_i' h(x_i)\right)^2}{\sum_{i=1}^{N} h^2(x_i)} \quad (7)$$

To define the basis function h, consider the special case where each basis function is a single feature (i.e., an element feature in the feature vector x). Notice, however, that in the case of LambdaSMART, the basis function may be a decision tree, and the additive model is a non-linear model. Thus, the Boosting Algorithm can be regarded as a feature selection method where at each iteration the gain of each feature is estimated (according to Equation (7)) with its optimal coefficient (computed according to (6)), and then the feature with the largest gain is selected and added to the base model. As a result, the additive model is a linear model (except for the case where the background model is nonlinear). Experiments performed by the inventors revealed that in the Web search realm where training data is usually noisy and perhaps very different from test data (because web queries and pages can evolve dramatically), a linear additive model is robust, may have low likelihood of overfitting, and may often outperform a tree-based additive model such as LambdaSMART.

Base Model Update

Step 5 of algorithm 160 updates the base model by adding the chosen optimal basis function with its optimal coefficient. As shown in step 4 of algorithm 160 (selecting the optimal basis function), the optimal coefficient of each candidate basis function is computed when the basis function is evaluated. However, adding the basis function using its optimal coefficient is prone to be overfitting. A shrinkage parameter $0<v<1$ ($v=0.5$ was used experimentally), and the update equation in step 5 of algorithm 160 is thus rewritten as $$F_m(x) = F_{m-1}(x) + v\beta_m h(x; a_m) \quad (9)$$

In addition to the use of a shrinkage parameter, another method to improve the robustness of the statistical model is to inject randomness into the basis function estimation procedure. Specifically, at each iteration a subsample of the training data is drawn at random (without replacement) from the full training data set, and similarly, a subsample of the features is drawn at random (without replacement) from the full feature set. The smaller these subsamples, the more randomness is introduced. A sample rate of 0.7 for both training data sampling and feature sampling may be used. The two randomly selected subsamples are then used, instead of the full samples, to fit the basis function and compute the model update for the current iteration.

Figure 4:
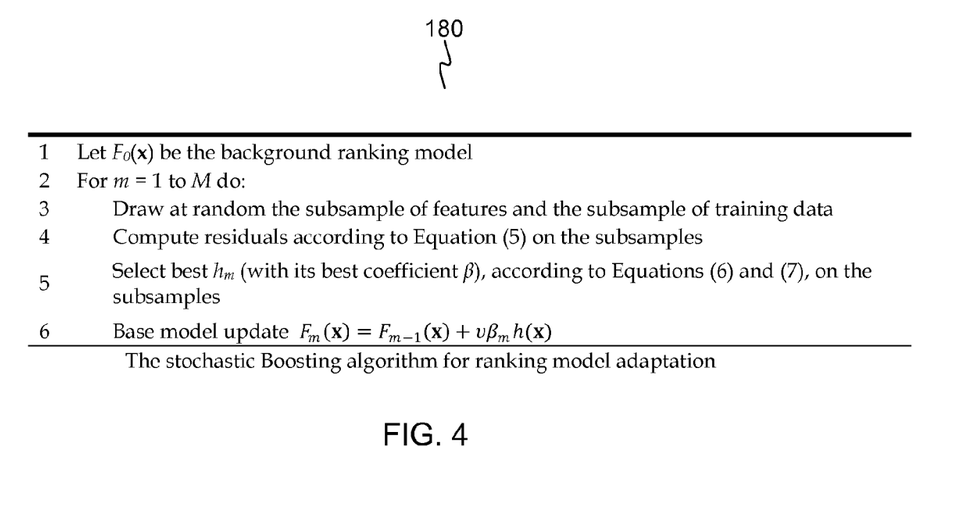
FIG. 4 shows another algorithm for model adaptation using the Boosting Algorithm for model adaptation.

FIG. 4 shows another algorithm 180 for model adaptation using the Boosting Algorithm for model adaptation. Algorithm 180 is a version of algorithm 160 modified as describe above.

Local Linear Model Fitting

Figure 5:
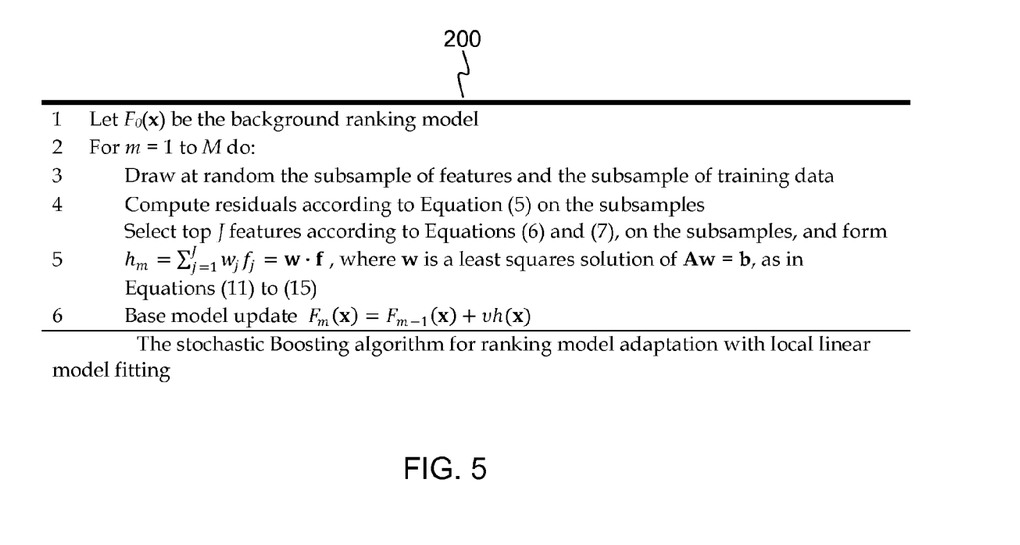
FIG. 5 shows another use of the Boosting Algorithm.

Methods for speeding up algorithm 180 will now be explained. As described early, if it is assumed that h is a single-feature function, algorithm 180 is like a feature selection method where the weight of only one feature is updated at each iteration (line 6 of algorithm 180). Now assume that h is a linear model in which multiple features are linearly interpolated $$h = \sum_{j=1}^{J} w_j f_j \quad (10)$$

where $f_j$ is the j-th feature, and $J>1$ ($J=5$ in experiments). Using the vector notation: $h = w \cdot f$. FIG. 5 shows another algorithm 200. At each iteration, the top J features, instead of the top-1 feature, are selected to form h, and then the weight vector w is optimized by solving the linear system which will be described below.

Let b be an N-dimensional vector of residuals where each element $b_i$, for $i=1 \ldots N$, is the residual of the i-th training sample. Let w be a J-dimensional weight vector where each element $w_j$, for $j=1 \ldots J$, is the j-th weight in the basis function h of Equation (10). Let A be a matrix of size (J, N) and $N>J$, where each element $a_{ji}$ is the value of j-th feature in i-th training sample. Now, fitting the linear model h to the residuals of training samples is equivalent to finding a least squares solution to the linear system Aw=b. According to the least squares theorem, the solution w* is found by solving the normal equations $$(A^T A) w^* = A^T b \quad (11)$$

Now define a square matrix $A^+ = (A^T A)$. If $A^+$ is symmetric and positive definite, it can be decomposed into a pair of lower and upper triangular factors via so-called Cholesky decomposition, which is efficient. Specifically, Cholesky decomposition constructs a lower triangular matrix L whose transpose $L^T$ can itself server as the upper triangular part. That is, replace Equation (11) by $$L L^T = A^+ = A^T A \quad (12)$$

Then use the decomposition to solve the original normal equation system of Equation (11) as $$(A^T A) w^* = L L^T w^* = L y = A^T b \quad (13)$$

y first solving for the vector y via forward substitution such that $$L y = A^T b \quad (14)$$

and then solving for the vector w via backsubstitution such that $$L^T w^* = y \quad (15)$$

Cholesky decomposition requires the matrix $A^+$ to be symmetric and positive-definite. Experiments showed that in most cases the requirement is met. In the cases where it does not, set J=1. That is, give up the local linear model fitting, and back off to the original algorithm 180.

Quadratic Basis Functions

To this point, it has been assumed that the basis function h is a single feature, or equivalently a linear term, thus the resulting base model is a linear model (except for the case where the background model is nonlinear). A simple method that allows going beyond the linear model is to define has a polynomial term of the inputs. For example, we have a quadratic model if h is defined as a product of two features, i.e., $h = f_i f_j$. Notice that once the basis function has been determined, the additive expansion models of Equation (4) are linear in these new basis functions, and the fitting proceeds as before, e.g., as algorithm 180 and algorithm 200.

However, the number of basis functions grows exponentially in the degree of the polynomial. A full quadratic model in p inputting features may have $O(p^2)$ square and cross-product terms. For efficiency, one may only select p quadratic terms randomly from these $p^2$ candidates as follows. First, randomly shuffle the list of p features twice, and get two different shuffled lists. Then, form p quadratic basis functions as $h_i = f_{i1} f_{i2}$, i=1 ... p, where $f_{i1}$ and $f_{i2}$ are the i-th features in the first and the second randomly shuffled lists, respectively.

It was also found, experimentally, that instead of fitting the model using a mixed set of linear and quadratic terms in one adaptation procedure (i.e., algorithm in FIGS. 2 and 3), it may improve results when two separate model adaptation procedures are used that fit the model using linear and quadratic basis functions respectively. That is, start with the base model using only the background model. Then the base model is adapted using only linear basis functions. Finally, the updated base model is further adapted using quadratic basis functions.

Experiments also showed that instead of fitting the model using a mixed set of linear and quadratic terms in one adaptation procedure (i.e., algorithm 180 and algorithm 200), better results are obtained when we used two separate model adaptation procedures that fit the model using linear and quadratic basis functions respectively. That is, we start with the base model using only the background model. Then the base model is adapted using only linear basis functions. Finally, the updated base model is further adapted using quadratic basis functions.

Using Tree Basis Functions as Features

Another method which may allow going below linear model is to defined has a decision tree. The algorithm is then like LambdaSMART. However, the inventor's experiments have shown that LambdaSMART does not perform well. There might be two reasons. First, trees are less robust to noise, either in the labels or in the features. Second, the per-tree weights learned during the boosting algorithm (as shown in the algorithm 160) are learned in a greedy manner. That is, in the forward stage-wise manner of the boosting algorithm, these weights are computed only once when the basis functions (i.e., the decision trees) are constructed.

To address this, one solution is to use the tree-based boosting algorithm as a feature generator. That is, run the tree-based boosting algorithm as described above. But instead of using the resulting additive model as the adaptation ranking model directly, take the outputs of the trees as new features, and then retrain a ranking model (e.g., a new neural net model) on adaptation data using both the original features and the newly generated tree features.

This method may solve problems related to use of LambdaSMART as mentioned earlier. For the first problem, the robustness of the models is believed to be due to how they are trained, and (for multi-layer neural net models) due to the averaging that is performed internally. The hope is that these benefits will also hold for models trained on the tree features, improving the robustness of the trained system. For the second problem, neural net training is not greedy, in the sense that the weights are learned iteratively over many passes of the training data, so the learned value that a given weight takes, depends on the learned values that the other weights take. Furthermore, the model may be trained using LambdaRank, which has been shown to be empirically optimal for the cost function we are optimizing. Finally, this will result in higher accuracy for a given number of trees, or equivalently, higher speed for the same previous accuracy, and speed is paramount in web search engines.

Conclusion

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on. The computing devices may implement the embodiments individually or cooperatively/distributitatively.

The invention claimed is:

1. A server device comprising a computer hosting a search engine that uses an adaption model to rank documents in a search domain corresponding to a search domain of a query received by the computer server, the adaptation model being stored on the server device or another server device communicating with the server device, the adaptation model having been derived by a model adaptation process comprising:

receiving a trained background model that was trained before performance of the model adaptation process with labeled training data, the background model having been used to rank documents searched and found to match queries;

when starting a process for iteratively refining a base model, using the background model as the initial base model; and iteratively refining the base model by repeatedly computing a residual error of the base model as applied to labeled training data, repeatedly computing a basis function that minimizes a difference between the residual error and the basis function as applied to the labeled training data, and repeatedly updating the base model according to the computed basis function, wherein a tree-based boosting algorithm is used as a tree feature generator, and wherein the basis function is combined with the base model in a way that reduces a magnitude of the basis function that is combined with the base model.

2. A server device according to claim 1, wherein the basis function comprises a decision tree.

3. A server device according to claim 2, wherein the process further comprises taking outputs of the decision tree as new features, and then retraining a ranking model, which comprises a new neural net model, on adaptation data using both the original features and newly generated tree features.

4. A server device according to claim 1, wherein a tree-is used as a tree feature generator.

5. A server device comprising a computer hosting a search engine that uses an adaption model to rank documents in a search domain corresponding to a search domain of a query received by the computer server, the adaptation model being stored on the server device or another server device communicating with the server device, the adaptation model having been derived by a model adaptation process comprising:

receiving a trained background model that was trained before performance of the process with labeled training data, the background model having been used to rank documents searched and found to match queries;

when starting a process for iteratively refining a base model, using the background model as the initial base model;

iteratively refining the base model by repeatedly computing a residual error of the base model as applied to labeled training data, repeatedly computing a basis function that minimizes a difference between the residual error and the basis function as applied to the training data, and repeatedly updating the base model according to the computed basis function, wherein the basis function is combined with the base model in a way that reduces a magnitude of the basis function that is combined with the base model, wherein local linear model fitting is used to increase the speed of the iterative refining, the basis function comprises a decision tree and a tree-based boosting algorithm is used as a feature generator; and taking outputs of the tree-based boosting algorithm on the decision tree as new features, and then retraining a ranking model on adaptation data using both original tree features and the new features.

* * * * *